US008437152B2

(12) United States Patent  
Sato et al.

(10) Patent No.: US 8,437,152 B2  
(45) Date of Patent: May 7, 2013

(54) SWITCHING POWER SOURCE DEVICE

(75) Inventors: Makoto Sato, Kawagoe (JP); Mizuki Utsuno, Kawagoe (JP)

(73) Assignee: Sanken Electric Co., Ltd. (JP)

( * ) Notice: Subject to any disclaimer, the term of this patent is extended or adjusted under 35 U.S.C. 154(b) by 700 days.

(21) Appl. No.: 12/664,649

(22) PCT Filed: Mar. 12, 2008

(86) PCT No.: PCT/JP2008/054469  
§ 371 (c)(1),  
(2), (4) Date: Dec. 14, 2009

(87) PCT Pub. No.: WO2008/152839  
PCT Pub. Date: Dec. 18, 2008

(65) Prior Publication Data  
US 2010/0182808 A1    Jul. 22, 2010

(30) Foreign Application Priority Data

Jun. 15, 2007 (JP) ................................. 2007-159313

(51) Int. Cl.  
H02M 3/335 (2006.01)

(52) U.S. Cl.  
USPC .................... 363/21.02; 363/21.06; 363/21.14

(58) Field of Classification Search ......... 363/20–21.02, 363/21.06, 21.12–21.18  
See application file for complete search history.

(56) References Cited

U.S. PATENT DOCUMENTS

| | | | | |
|---|---|---|---|---|
| 5,519,599 A | * | 5/1996 | Shinada et al. | 363/21.06 |
| 5,631,810 A | * | 5/1997 | Takano | 363/21.05 |
| 5,719,755 A | | 2/1998 | Usui | |
| 5,943,222 A | | 8/1999 | Ogawa | |
| 7,262,977 B2 | * | 8/2007 | Kyono | 363/21.06 |
| 7,450,402 B2 | * | 11/2008 | Jitaru | 363/20 |
| 7,940,536 B2 | * | 5/2011 | Salato | 363/21.14 |

FOREIGN PATENT DOCUMENTS

JP    9-163736    6/1997

OTHER PUBLICATIONS

WO2008/152839.

* cited by examiner

*Primary Examiner* — Jessica Han  
(74) *Attorney, Agent, or Firm* — Faier & Faier P.C.; James Michael Faier; Martin Faier

(57) ABSTRACT

A pseudo-resonant switching power source device is provided which comprises a primary winding 2a of a transformer 2 and a main MOS-FET 3 connected in series to a DC power source 1, a voltage-resonant capacitor 12 connected in parallel to main MOS-FET 3, a rectification smoother 4 connected to a secondary winding 2b of transformer 2 and having a rectification MOS-FET 51 and a smoothing capacitor 6, a synchronized rectification controller 52 for turning rectification MOS-FET 51 on after turning-off of main MOS-FET 3 and turning rectification MOS-FET 51 off before turning-on of main MOS-FET 3, a pulse width elongation circuit 55 for extending on-pulse width of rectification MOS-FET 51, and a main control circuit 8 for producing main drive signals to turn main MOS-FET 3 off and on with operation frequency responsive to on-pulse width of rectification MOS-FET 51 extended by pulse width elongation circuit 55 to vary operation frequency of main MOS-FET 3 so as to restrain noise by high frequency components in main drive signals from main control circuit 8.

12 Claims, 8 Drawing Sheets

US 8,437,152 B2

1

SWITCHING POWER SOURCE DEVICE

This application is a U.S. national phase submission of Patent Cooperation Treaty PCT/JP2008/054469 under 35 U.S.C. 371 based on Japanese Patent Application No. 2007-159313 filed 15 Jun. 2007. This invention relates to a switching power source device of the type which may vary an operation frequency of a main switching element on a primary side to control noise resulted from high frequency components contained in main drive signals to main switching element.

TECHNICAL FIELD IN INDUSTRY

Prior Art

Pseudo-resonant switching power source devices of flyback type have been widely used in the past for their less noise and less power loss, and specifically, as exemplified in FIG. 6, some of them may comprise a primary winding 2a of a transformer 2 and a main MOS-FET 3 as a main switching element both connected in series to a DC voltage 1, a voltage-resonant capacitor 12 connected in parallel to main MOS-FET 3, a rectification smoothing circuit or rectification smoother 4 comprised of a rectification diode 5 and a smoothing capacitor 6 both connected between a secondary winding 2b of transformer 2 and a load 7, and a main control circuit or controller 8 for producing main drive signals $V_{G1}$ to main MOS-FET 3 to turn it on and off. When MOS-FET 3 is turned on, an electric current flow runs through primary winding 2a and MOS-FET 3 to accumulate electric energy in transformer 2, and when MOS-FET 3 is turned off, electric energy stored in transformer 2 is released to cause output current to flow into rectification smoother 4. A parasitic diode 3a is connected between drain-source terminals of main MOS-FET 3. Provided in transformer 2 is an auxiliary winding 2c which produces an oscillating voltage $V_{RG}$ by virtue of pseudo-resonance in voltage between primary winding 2a and voltage-resonant capacitor 12 after completion of energy release from transformer 2. Main controller 8 appreciates a first minimum value or kick-off voltage appearing on auxiliary winding 2c of transformer 2 to switch main MOS-FET 3 from on to off.

Main controller 8 comprises an error amplification circuit or error amplifier 9 for producing an error voltage signal $S_{ER}$ between a reference voltage $V_R$ and DC output voltage $V_O$ on a smoothing capacitor 6 in rectification smoother 4 applied to a load 7, a minimal voltage detecting circuit or minimal voltage detector 11 for producing a minimal voltage detection signal $V_{BD}$ of high voltage level when auxiliary winding 2c of transformer 2 produces oscillating voltage $V_{RG}$ lowered to a first minimal value, and a drive signal generation circuit or drive signal generator 10 for producing main drive signals $V_{G1}$ to turn main MOS-FET 3 from off to on upon receiving minimal voltage detection signal $V_{BD}$ of high voltage level from minimal voltage detector 11. Main drive signal $V_{G1}$ has its pulse width corresponding to voltage level of error voltage signal $S_{ER}$ from error amplifier 9.

As is apparent from FIG. 7, error amplifier 9 comprises voltage-dividing resistors 21, 22 connected in parallel to smoothing capacitor 6 in rectification smoother 4, a current limiting resistor 23 connected to first voltage-dividing resistor 21, a light emitter 24a in a photo-coupler 24 connected in series to current limiting resistor 23, and a shunt regulator 25 which has a cathode terminal connected to light emitter 24a of photo-coupler 24, an anode terminal connected to a second-

2 ary ground and an REF terminal connected to a split tap between voltage-dividing resistors 21, 22.

As shown in FIG. 8, drive signal generator 10 comprises a photo-sensor 24b of photo-coupler 24 connected to a drive power source $V_{CC}$ through a current limiting resistor 31, a PWM capacitor 32 connected between photo-sensor 24b of photo-coupler 24 and a primary ground, a discharge MOS-FET 33 connected in parallel to PWM capacitor 32, a normal power source 34 for producing a reference voltage $V_{R3}$, a PWM comparator 35 which has a non-inverted input terminal connected to an output terminal of PWM capacitor 32 and an inverted input terminal connected to normal power source 34, and an RS flip-flop 36 which has a set terminal S connected to an output terminal of PWM comparator 35, a reset terminal R connected to an output terminal of minimal voltage detector 11, a non-inverted output terminal Q connected to a gate terminal of discharge MOS-FET 33 and an inverted output terminal Q-bar connected to a gate terminal of main MOS-FET 3.

As shown in FIG. 9, minimal voltage detector 11 comprises a normal power source 41 for generating a reference voltage $V_{R1}$, a polarity detecting comparator 42 which has a non-inverted input terminal connected to auxiliary winding 2c of transformer 2 and an inverted input terminal connected to normal power source 41, a changeover diode 43 having an anode terminal connected to an output terminal of polarity detecting comparator 42, a timer capacitor 44 connected between a cathode terminal of changeover diode 43 and a primary ground, a discharge resistor 45 connected in parallel to timer capacitor 44, a normal power source 46 for generating a reference voltage $V_{R2}$, and a minimal voltage detecting comparator 47 which has an inverted input terminal connected to a junction of timer capacitor 44 and discharge resistor 45, and a non-inverted input terminal connected to a normal power source 46.

In operation of the switching power source device shown in FIG. 6, RS flip flop 36 in its reset state produces a main drive signal $V_{G1}$ of high voltage level at inverted output terminal Q-bar to gate terminal of main MOS-FET 3 which therefore is switched from off to on. At the same time, RS flip flop 36 issues a discharge drive signal $V_{ST}$ of low voltage level at non-inverted output terminal Q to gate terminal of discharge MOS-FET 33 which therefore still remains in off condition. When main MOS-FET 3 is turned on, linearly increasing primary current $I_{Q1}$ shown in FIG. 10 runs from DC power source 1 through primary winding 2a of transformer 2 and main MOS-FET 3 to DC power source 1 to accumulate electric energy in transformer 2. On the other hand, primary current $I_{Q1}$ provokes a negative voltage on secondary winding 2b of transformer 2 to adversely bias rectification diode 5 into its non-conductive state in rectification smoother 4.

Voltage dividing resistors 21, 22 split DC output voltage $V_O$ on load 7 from smoothing capacitor 6 of rectification smoother 4 to produce a parted voltage $V_{DT}$ at the junction of dividing resistors 21, 22 to REF terminal of shunt regulator 25 which then compares parted voltage $V_{DT}$ on dividing resistor 22 with a reference voltage $V_R$ incorporated therein to cause a regulatory current flow to run through current-limiting resistor 23, light emitter 24a of photo-coupler 24 and shunt regulator 25 so that regulatory current flow represents an error voltage, the differential between parted voltage $V_{DT}$ and reference voltage $V_R$. Specifically, when DC output voltage $V_O$ is higher, parted voltage $V_{DT}$ more rises to reduce impedance between anode-cathode terminals of shunt regulator 25 while more increasing regulatory current flow through current limiting resistor 23, light emitter 24a and shunt regulator 25, thereby causing light emitter 24a to emit a greater optical output signal $S_{ER}$. Adversely, when DC output voltage $V_O$ is lower, parted voltage $V_{DT}$ more diminishes to increase impedance between anode-cathode terminals of shunt regulator 25 while more reducing regulatory current flow through current limiting resistor 23, light emitter 24a and shunt regulator 25, thereby causing light emitter 24a to emit a smaller optical output signal $S_{ER}$. In this way, error amplifier 9 may serve to create optical output signal $S_{ER}$ of the level corresponding to error voltage, the differential between divided voltage $V_{DT}$ of DC output voltage $V_O$ and reference voltage $V_R$ to forward optical output signal $S_{ER}$ to photo-sensor 24b in drive signal generator 10.

When photo-sensor 24b of photo-coupler 24 receives optical output signal $S_{ER}$ from light emitter 24a, under off state of discharge MOS-FET 33, a charge current flows from drive power source $V_{CC}$ through current limiting resistor 31 and photo-sensor 24b of photo-coupler 24 to PWM capacitor 32 to electrically charge it, while charge current has its amount corresponding to the level of optical output signal $S_{ER}$. Specifically, optical output signal $S_{ER}$ of its higher level causes more amount of charge current to flow into PWM capacitor 32, thereby resulting in rapid rise of directive voltage $V_{C3}$ on PWM capacitor 32 shown in FIG. 10. Adversely, optical output signal $S_{ER}$ of its lower level causes less amount of charge current to flow into PWM capacitor 32, thereby causing moderate increase of directive voltage $V_{C3}$ on PWM capacitor 32 shown in FIG. 10.

When directive voltage $V_{C3}$ on PWM capacitor 32 comes to the same level as reference voltage $V_{R3}$ on normal power source 34 at a point $t_1$ of time, PWM comparator 35 produces an output signal $V_{CP3}$ of high voltage level shown in FIG. 10 to set terminal of RS flip flop 36 to switch it to its set state, and therefore, RS flip flop 36 shifts main drive signal $V_{G1}$ from high to low voltage level at inverted output terminal Q-bar to gate terminal of main MOS-FET 3 to turn it from on to off. At the same time, RS flip flop 36 shifts discharge drive signal $V_{ST}$ from low to high voltage level at non-inverted output terminal Q to gate terminal of discharge MOS-FET 33 to turn it from off to on. At the moment, PWM capacitor 32 is instantaneously discharged to cause PWM comparator 35 to at once switch output signal $V_{CP3}$ from high to low voltage level. Thus, charge current through PWM capacitor 32 may be controlled depending on the level of DC output voltage $V_O$ on load 7 from smoothing capacitor 6 of rectification smoother 4 to adjust on-pulse width of main drive signal $V_{G1}$ from RS flip flop 36 to gate terminal of main MOS-FET 3.

When maim MOS-FET 3 is turned off at point $t_1$, auxiliary winding 2c of transformer 2 induces voltage $V_{RG}$ of positive polarity shown in FIG. 10 higher than reference voltage $V_{R1}$ of normal power source 41 so that polarity detecting comparator 42 switches its output signal $V_{CP1}$ from low to high voltage level. This biases changeover diode 43 to the forward direction for its conductive state to momentarily electrically charge timer capacitor 44, and then when voltage $V_{C2}$ on timer capacitor 44 shown in FIG. 10 exceeds reference voltage $V_{R2}$ of normal power source 46, minimal voltage detecting comparator 47 switches minimal voltage detection signal $V_{BD}$ from high to low voltage level to reset terminal R of RS flip flop 36. Meanwhile, positive-polarity voltage is induced on secondary winding 2b of transformer 2 to bias rectification diode 5 of rectification smoother 4 in the forward direction for its conductive state so that electric energy accumulated in transformer 2 during on-period of main MOS-FET 3 is released to rectification smoother 4 to thereby cause current flow to feed from secondary winding 2b through rectification diode 5 and smoothing capacitor 6 to load 7 while electrically charging smoothing capacitor 6 and applying output voltage $V_O$ to load 7.

When release of electric energy stored in transformer 2 is completed at point $t_2$, voltage-pseudo resonance occurs through primary winding 2a of transformer 2 and voltage-resonant capacitor 12 while lowering each voltage on primary and secondary windings 2a, 2b of transformer 2 in sinusoidal wave, and this performance reduces winding voltage $V_{RG}$ on auxiliary winding 2c of transformer 2 and voltage $V_{Q1}$ between drain-source terminals of main MOS-FET 3 in sinusoidal wave as shown in FIG. 10. When winding voltage $V_{RG}$ on auxiliary winding 2c of transformer 2 falls beneath reference voltage $V_{R1}$ of normal power supply 41 at point $t_3$, polarity detecting comparator 42 of FIG. 9 changes output signal $V_{CP1}$ from high to low voltage level to bias changeover diode 43 in the adverse direction for non-conductive state. This allows electric charge to release from timer capacitor 44 through discharge resistor 45 to gradually reduce charged voltage $V_{C2}$ of timer capacitor 44 with a time constant determined by the product of a resistance value by discharge resistor 45 and a capacitance by timer capacitor 44.

In other words, timer capacitor 44 is discharged through discharge resistor 45 toward reference voltage $V_{R2}$ on normal power supply 46, and at the same time, auxiliary winding 2c of transformer 2 reduces associated voltage $V_{RG}$ by voltage-pseudo resonance toward a minimal voltage less than reference voltage $V_{R1}$ of normal power supply 41 at point $t_4$ shown in FIG. 10. Switching power source device shown in FIG. 6 can select a suitable time constant of resistance value by discharge resistor 45 and capacitance by timer capacitor 44 to match, at point $t_4$, expired times necessary for electric discharge of timer capacitor 44 to a same level as reference voltage $V_{R2}$ and for reduction in voltage $V_{RG}$ of auxiliary winding 2c to minimal voltage. In other words, timer capacitor 44 starts electric discharge at point $t_3$ and reduces associated voltage $V_{C2}$ to a same level as reference voltage $V_{R2}$ of normal power supply 46 at point $t_4$, lowering voltage $V_{C2}$ during the period from $t_3$ to $t_4$. On the other hand, sinusoidal voltage is induced by voltage-pseudo resonance of primary winding 2a of transformer 2 and voltage-resonant capacitor 12, and approximately a half cycle of sinusoidal voltage minimizes voltage provoked on primary winding 2a of transformer 2 to a minimal value during the period from $t_3$ to $t_4$ in agreement with the period necessary for discharge of timer capacitor 44 to the level of reference voltage $V_{R2}$. When voltage $V_{C2}$ on timer capacitor 44 shown in FIG. 10 comes down to reference voltage $V_{R2}$ of normal power supply 46 at point $t_4$, minimal voltage detecting comparator 47 changes minimal voltage detecting signal $V_{BD}$ from low to high voltage level to reset terminal R of RS flip flop 36 to turn it to reset state so that it switches main drive signal $V_{G1}$ from low to high voltage level at inverted output terminal Q-bar to gate terminal of main MOS-FET 3 to turn it from off to on. As main MOS-FET 3 performs its switching operation at and after point $t_4$ from which voltage $V_{Q1}$ shown in FIG. 10 between drain-source terminal of main MOS-FET 3 comes to a minimum value to reduce switching loss by main MOS-FET 3. Repetition of the foregoing workings causes continuous switching operation of main MOS-FET 3 to accumulate and release electric energy in and from transformer 2 and thereby supply DC output of consistent voltage $V_O$ to load 7 from secondary winding 2b of transformer 2 through rectification smoother 4.

The pseudo-resonant switching power source device shown in FIG. 6 can control harmonic or high frequency noise by smoothing serge voltage or harmonic components resulted from switching operation of main MOS-FET 3 by means of voltage-pseudo resonance of primary winding 2a and voltage-resonant capacitor 12 appeared after completion of energy release from transformer 2.

Also, Patent Document 1 as below discloses a DC-DC converter of PWM (Pulse Width Modulation) type which has a control circuit comprised of a PWM modulation circuit for controlling on-off period of a switching element depending on voltage of DC output and a frequency setting circuit of a resistor and a capacitor for setting frequency of on-off control signals generated from PWM modulation circuit, and a modulation means connected between an AC power source and capacitor in frequency setting circuit. In this DC-DC converter, modulation means serves to apply fluctuating voltage rectified from AC voltage of AC power source to a capacitor in a frequency setting circuit to modulate frequency of on-off control signals output from a PWM modulation circuit in response to fluctuating voltage for frequency jitter so as to fluctuate frequency of on-off control signals within a certain range so that its frequency components are dispersed within a constant range around a basic frequency: $f_C$ of on-off control signal shown in FIG. 12. Thus, frequency components of input feedback conductive noise are averagely within a frequency-fluctuating range of on-off control signals to reduce voltage level of input feedback conductive noise without intensive superimposition of noise voltages at a specific frequency.

[Patent Document 1] Japanese Patent Disclosure No. 2002-64979

DISCLOSURE OF INVENTION

Problem to be Solved by Invention

By the way, the prior art switching power source device shown in FIG. 6 determines frequency of main drive signals $V_{G1}$ to main MOS-FET 3 by a level of voltage applied from DC power source 1 to primary winding 2a of transformer 2 and a state of load 7 connected to secondary side, concentrating noise frequency components at a specific frequency of main drive signals $V_{G1}$ so that relative maximum of noise voltage level would be at basic frequency $f_C$ of main drive signals $V_{G1}$ as shown in FIG. 11. Accordingly, when main drive signals $V_{G1}$ to main MOS-FET 3 contain high frequency components, they induce noise which may cause malfunction of electronic instruments connected to or arranged around the power source device, however, disadvantageously prior art devices cannot control such noise. To solve this problem, it is proposed that a switching power source device makes frequency of main drive signals $V_{G1}$ of main MOS-FET 3 fluctuate in a certain range for frequency jitter to disperse frequency components within that range and thereby reduce voltage level of noise resulted from high frequency components contained in main drive signals $V_{G1}$ to main MOS-FET 3. However, if frequency jitter occurs in pseudo-resonant switching power source device shown in FIG. 6, unfavorably it incurs variation in DC output voltage $V_O$ due to change or movement in DC power supplied from secondary winding 2b of transformer 2 through rectification smoother 4 to load 7, and therefore, it cannot fluctuate operation frequency of main MOS-FET 3 at will.

Accordingly, an object of the present invention is to provide a pseudo-resonant switching power source device which varies operation frequency of a main switching element on a primary side to inhibit noise caused by high frequency components contained in main drive signals to the main switching element.

Means for Solving the Problem

The switching power source device according to the present invention, comprises a primary winding (2a) of a transformer (2) and a main switching element (3) both connected in series to a DC power source (1), a voltage-resonant capacitor (12) connected in parallel to main switching element (3), a rectification smoothing circuit (4) connected to a secondary winding (2b) of transformer (2) and having at least a rectification switching element (51) and a smoothing capacitor (6), a synchronized rectification control circuit (52) for producing synchronized control signals ($V_{SC}$) to turn rectification switching element (51) from off to on after turning-off of main switching element (3) and to turn rectification switching element (51) from on to off before turning-on of main switching element (3), a pulse width elongation circuit (55) for extending on-pulse width of rectification switching element (51), and a main control circuit (8) for producing main drive signals ($V_{G1}$) to turn main switching element (3) off and on with operation frequency responsive to on-pulse width of rectification switching element (51) extended by pulse width elongation circuit (55).

When main switching element (3) is turned off, excitation energy is released from secondary winding (2b) of transformer (2). If pulse width elongation circuit (55) extends on-pulse width of rectification switching element (51) after excitation energy has been discharged from transformer (2), regeneration current ($-I_{Q2}$) emerges which flows in the adverse direction from smoothing capacitor (6) in rectification smoother (4) through rectification switching element (51) and secondary winding (2b) of transformer (2) to smoothing capacitor (6) while voltage on smoothing capacitor (6) is applied on secondary winding (2b) of transformer (2). This induces voltage on primary winding (2a) of transformer (2), and at the same time, maintains voltage ($V_{Q1}$) between both main terminals of main switching element (3) approximately at a same level as that upon release of excitation energy from transformer (2). Then, when rectification switching element (51) is turned from on to off, voltage resonance occurs over voltage-resonant capacitor (12) and inductance in primary winding (2a) of transformer (2) while lowering voltage on primary winding (2a) of transformer (2), thereby diminishing voltage ($V_{Q1}$) between both main terminals of main switching element (3). When voltage ($V_{Q1}$) comes to a minimum value, main control circuit (8) turns main switching element (3) from off to on to elongate off-pulse width. In response to the foregoing action, main control circuit (8) maintains voltage on smoothing capacitor (6) approximately at a constant level to also extend on-pulse width of main switching element (3). In this way, variation of on-pulse width of rectification switching element (51) on secondary side leads to an adjustment in energy amount regenerated on primary side of transformer (2), a change in on-pulse width and off-pulse width and a variation in operation frequency of main switching element (3). This can disperse, into each frequency component, noise caused by main drive signals ($V_{G1}$) of main switching element (3) in response to fluctuating frequency of main switching element (3) without concentration of frequency components at a specific frequency region of main drive signals while preventing malfunction of electronic instruments by noise. Also, one of ordinary skill in the art would be able to select various oscillation time constants or current values to vary operation frequency of main switching element (3) as required. In addition, after turning-off of main switching element (3), energy regenerated on primary side of transformer (2) is accumulated in primary winding (2a) of transformer (2). Then, when main switching element (3) is switched from off to on, electric current ($-I_{Q1}$) to reset energy stored in primary winding (2a) of transformer (2) and to thereby pull charge from voltage-resonant capacitor (12) while voltage ($V_{Q1}$) between both main terminals of main switching element (3) comes to approximately zero, and main switching element (3) can be turned from off to on under voltage of zero volt between both main terminals for zero voltage switching (ZVS) to reduce switching loss thereof.

Effect of Invention

The present invention may vary on-pulse width of rectification switching element on secondary side of transformer to adjust an amount of energy regenerated in primary side of transformer for change in operation frequency of main switching element so that even the pseudo-resonant switching power source device can disperse noise resulted from main drive signals of main switching element to each frequency component depending on fluctuating frequency to restrain noise of each frequency component. Thus, the switching power source device can control concomitant noise to prevent malfunction of electronic equipments connected to or disposed around the device.

EXPLANATION OF SYMBOLS (1)··A DC power source, (2)··A transformer, (2a)··A primary winding, (2b)··A secondary winding, (2c)··An auxiliary winding, (3)··A main MOS-FET (A main switching element), (3a)··A parasitic diode, (4)··A rectification smoothing circuit (A rectification smoother), (5)··A rectification diode, (6)··A smoothing capacitor, (7)··A load, (8)··A main control circuit, (9)··An error amplification circuit (An error amplifier), (10)··A drive signal generation circuit (A drive signal generator), (11)··A minimal voltage detection circuit (A minimal voltage detector), (12)··A voltage-resonant capacitor, (21, 22)··voltage-dividing resistors, (23)··A current limiting resistor, (24)··A photo-coupler, (24a)··A light emitter, (24b)··A photo-sensor, (25)··A shunt regulator, (31)··A current limiting resistor, (32)··A PWM capacitor, (33)··A discharge MOS-FET, (34)··A normal power supply, (35)··A PWM comparator, (36)··An RS flip flop, (41)··A normal power supply, (42)··A polarity detecting comparator, (43)··A changeover diode, (44)··A timer capacitor, (45)··A discharge resistor, (46)··A normal power source, (47)··A minimal voltage detecting comparator, (51)··A rectification MOS-FET (A rectification switching element), (51a)··A parasitic diode, (52)··A synchronized rectification control circuit (A synchronized rectification controller), (53)··A current detecting resistor, (54)··A polarity detecting comparator, (55)··A pulse width elongation circuit, (56)··A chopping wave oscillating circuit (chopping wave oscillator), (57)··A changeover diode, (58)··A discharge resistor, (59)··A timer capacitor, (60)··A modulation comparator, (61)··A regular current generator, (62)··A timer capacitor, (63)··A discharge MOS-FET, (64)··A modulation comparator, (65)··An RS flip flop (A drive circuit),

BEST MODE FOR CARRYING OUT THE INVENTION

Embodiments of the switching power source device according to the present invention are described hereinafter in connection with FIGS. 1 to 5 of the drawings. Same symbols are applied to substantially same parts in FIGS. 1 to 5 as those shown in FIGS. 6 to 12, and their explanation is omitted.

Figure 1:
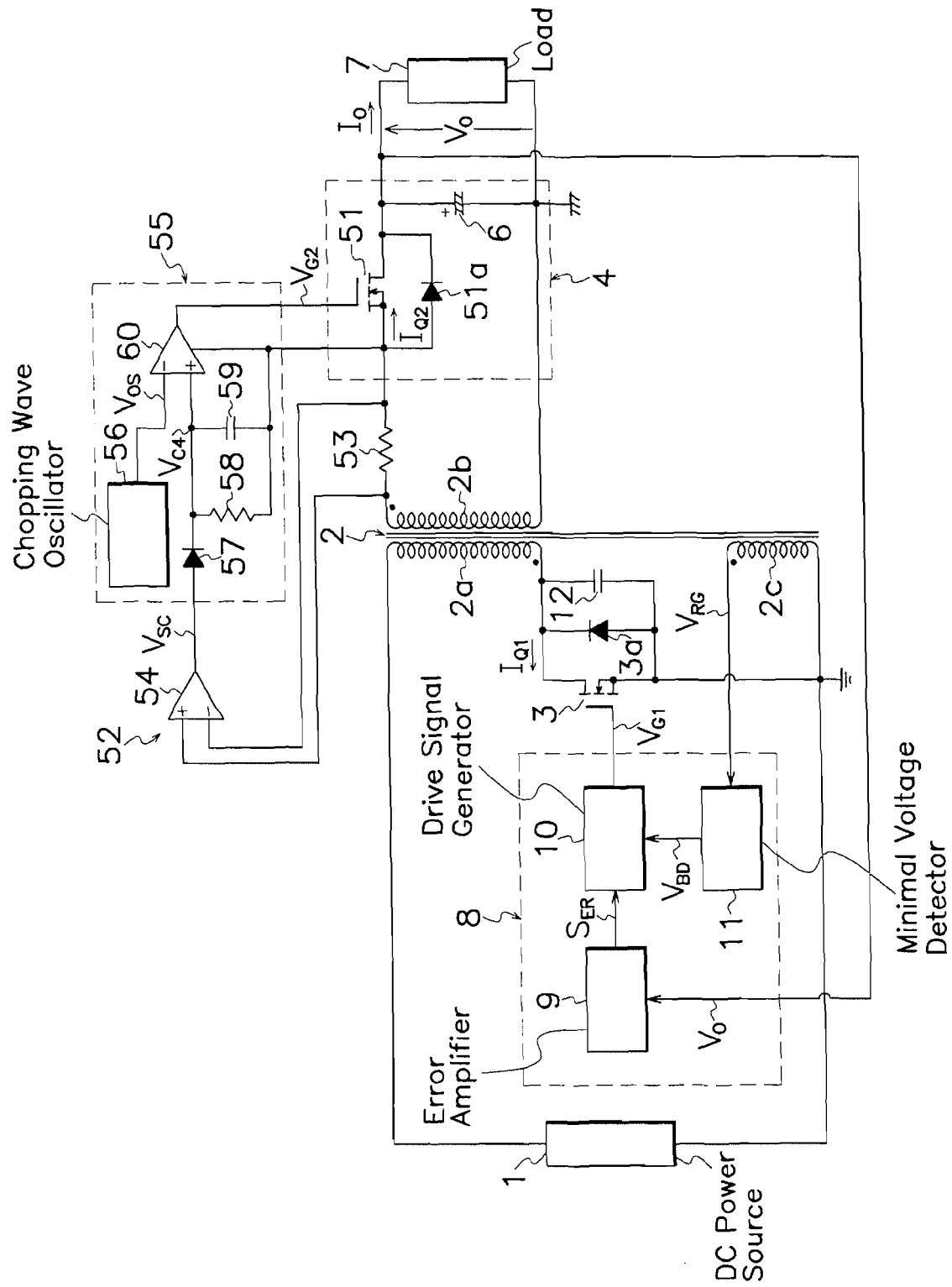
[FIG. 1] An electric circuit diagram showing an embodiment of a switching power source device according to the present invention.
Figure 6:
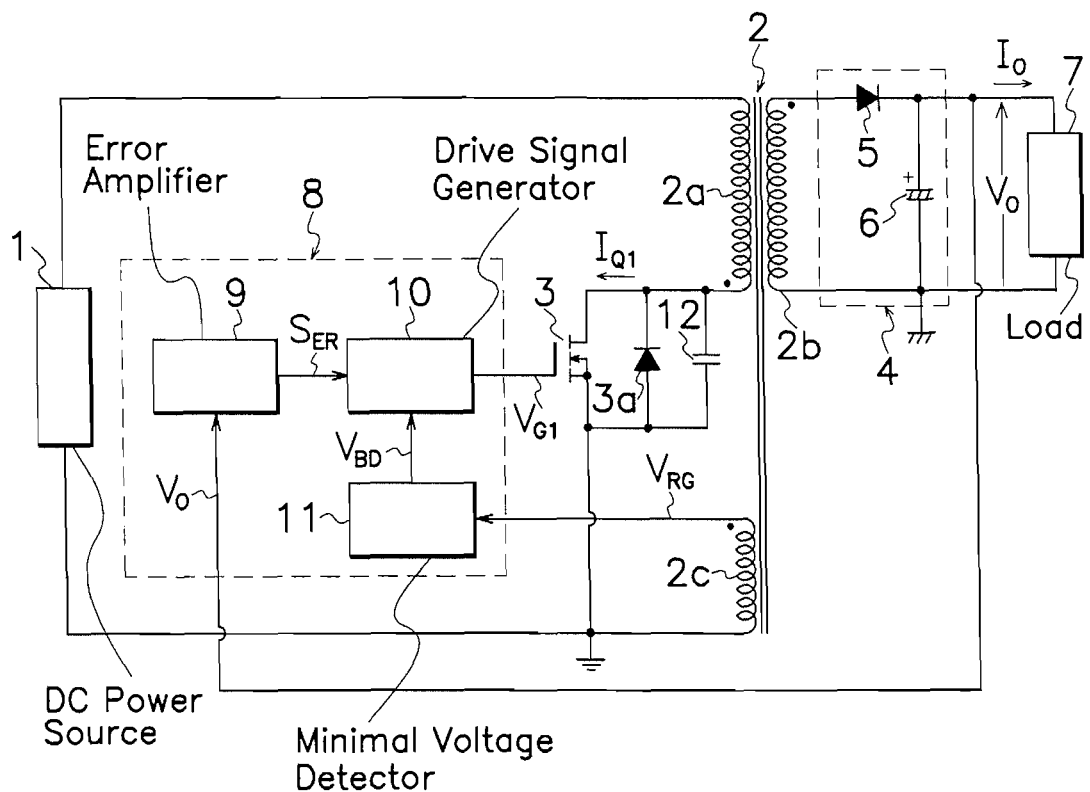
[FIG. 6] An electric circuit diagram of a prior art switching power source device of pseudo-resonance type.
Figure 7:
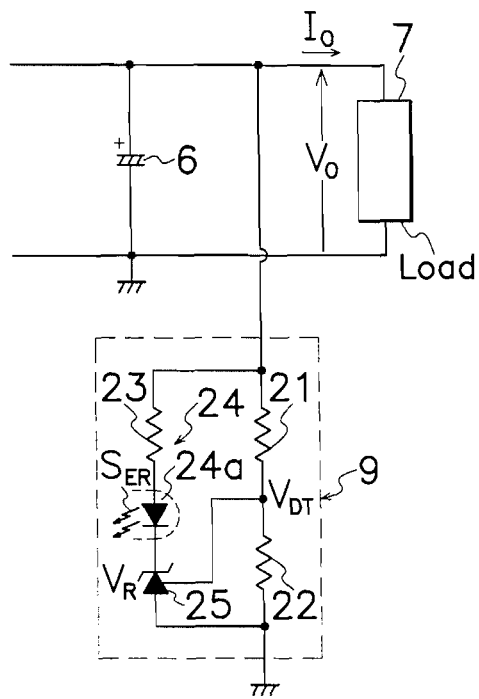
[FIG. 7] An electric circuit diagram showing a detail of an error amplification circuit in FIG. 6.
Figure 8:
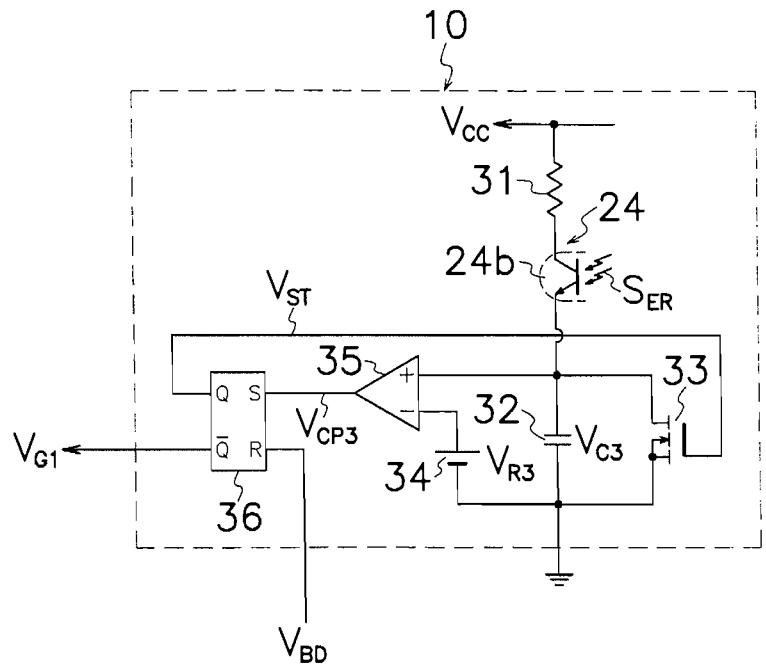
[FIG. 8] An electric circuit diagram showing a detail of a drive signal generation circuit in FIG. 6.
Figure 9:
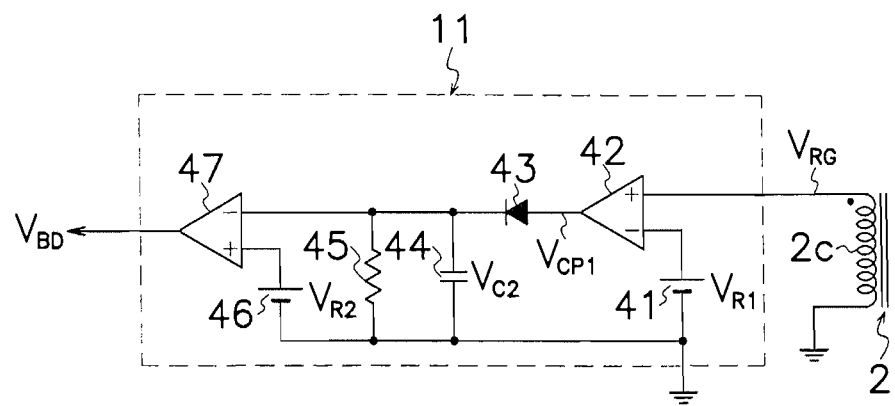
[FIG. 9] An electric circuit diagram showing a detail of a minimal voltage detection circuit in FIG. 6.
Figure 10:
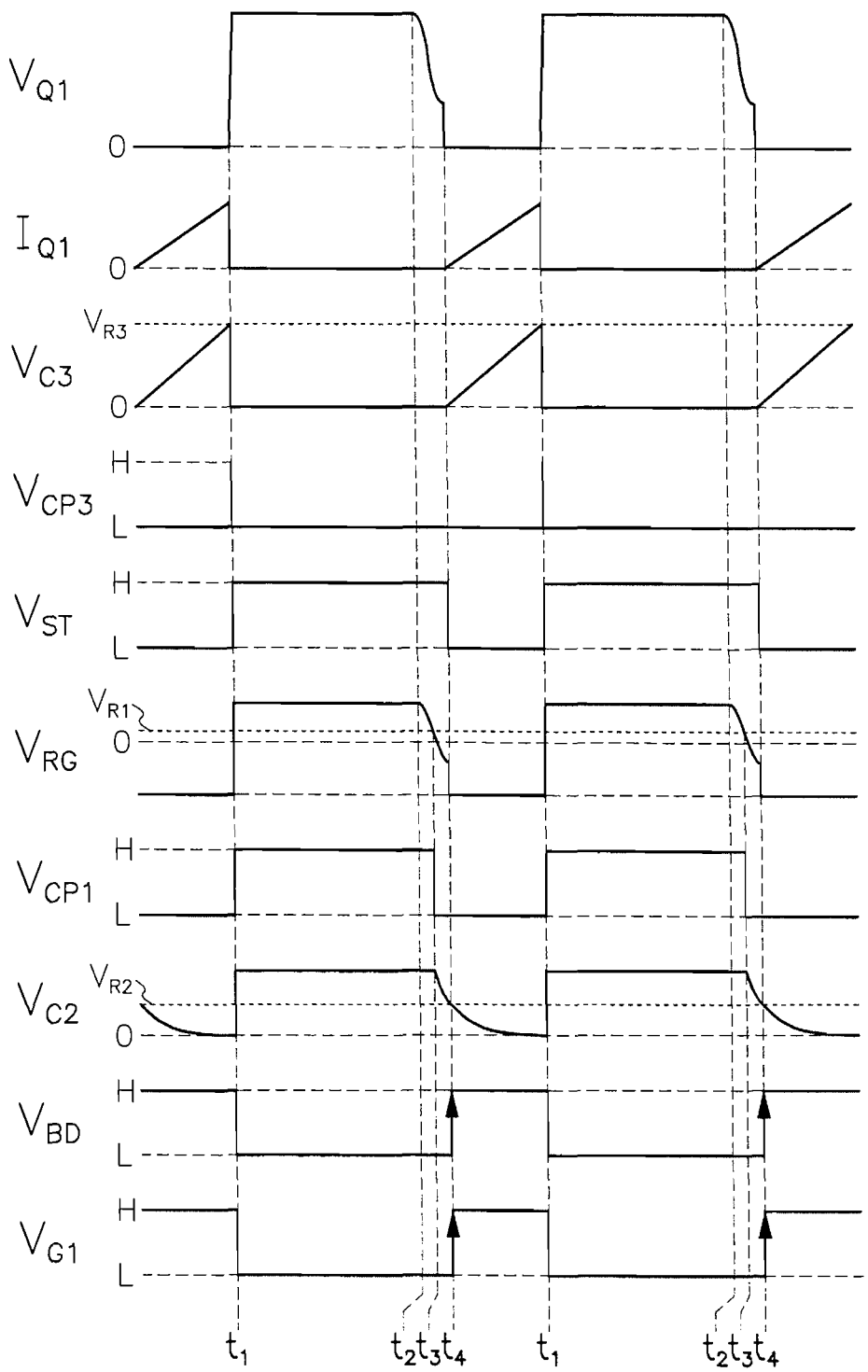
[FIG. 10] Waveform timing charts showing variation in voltages and electric currents at selected locations of the switching power source device in FIG. 6.
Figure 11:
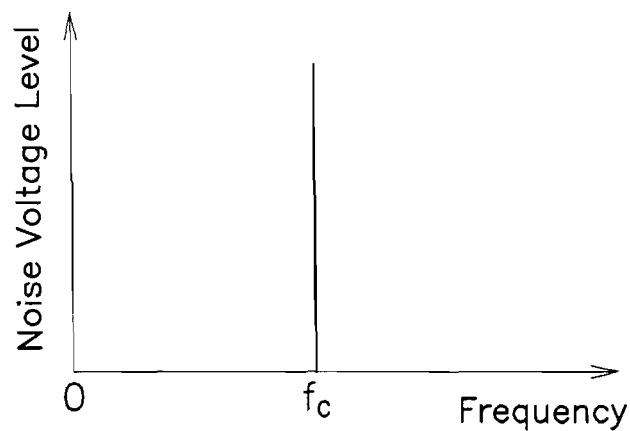
[FIG. 11] Waveform charts indicating frequency spectra of noise contained in main drive signals of the switching power source device shown in FIG. 6.
Figure 12:
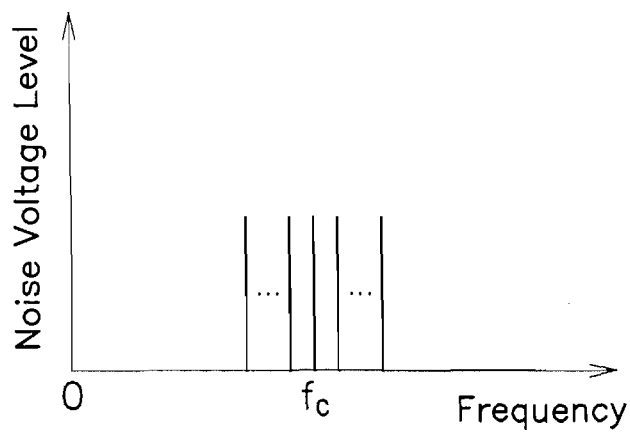
[FIG. 12] A waveform diagram showing frequency spectra of input feedback conductive noise in a prior art DC-DC converter of PWM type raising frequency jitter.

FIG. 1 shows a switching power source device according to an embodiment of the present invention has the following three differences (1) to (3) from prior art pseudo-resonant switching power source device shown in FIG. 6: (1) rectification diode 5 in rectification smoother 4 in FIG. 6 is replaced with a rectification MOS-FET 51 as a rectification switching element in FIG. 1; (2) a synchronous rectification controller 52 is connected between secondary winding 2b of transformer 2 and rectification smoother 4 in FIG. 1 to produce synchronous control signals $V_{SC}$ for turning rectification MOS-FET 51 from off to on after turning-off of main MOS-FET 3 and for turning rectification MOS-FET 51 from on to off before turning-on of main MOS-FET 3; and (3) a pulse width elongation circuit 55 is connected between synchronous rectification controller 52 and gate terminal of rectification MOS-FET 51 in FIG. 1 to extend on-pulse width of rectification MOS-FET 51. In the embodiment shown in FIG. 1, after synchronous rectification controller 52 switches synchronized control signals $V_{SC}$ from high to low voltage level, pulse width elongation circuit 55 retards off-time of rectification MOS-FET 51 by extended pulse width to prolong on-pulse width of rectification MOS-FET 51. A parasitic diode 51a is connected between drain-source terminals of rectification MOS-FET 51.

Figure 2:
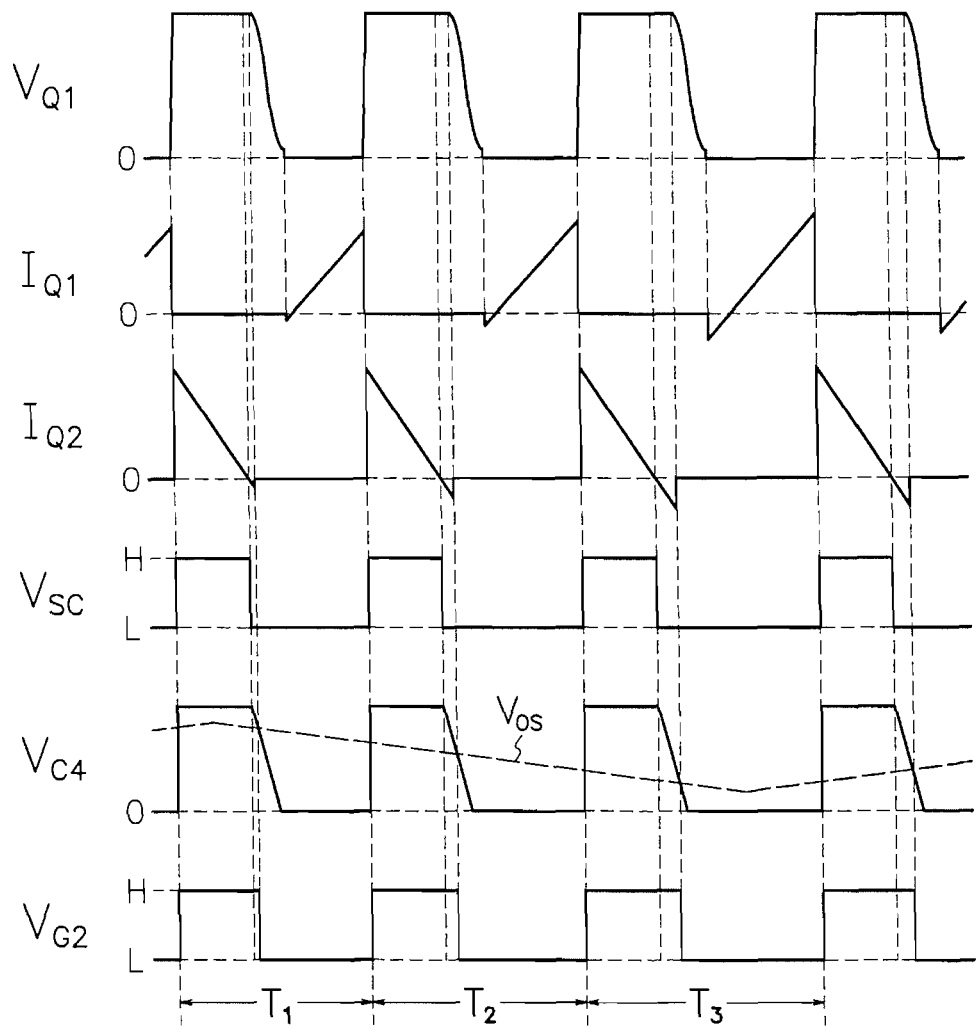
[FIG. 2] Waveform timing charts showing variation in voltages and electric currents at selected locations of the switching power source device in FIG. 1.
Figure 3:
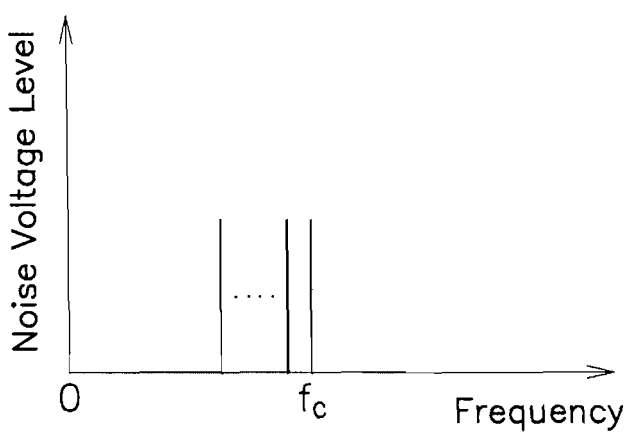
[FIG. 3] Waveform charts indicating frequency spectra of noise contained in main drive signals of the switching power source device shown in FIG. 1.

Synchronous rectification controller 52 comprises a current detecting resistor 53 connected in series to rectification MOS-FET 51 for detecting electric current $I_{Q2}$ running through rectification MOS-FET 51 as a corresponding voltage level, and a polarity detecting comparator 54 which has non-inverted and inverted input terminals respectively connected to detective (left) and reference (right) terminals of current detecting resistor 53. Specifically, synchronous rectification controller 52 serves to pick out, via current detecting resistor 53, electric current $I_{Q2}$ from secondary winding 2b through rectification MOS-FET 51 after turning-off of main MOS-FET 3 during energy release from transformer 2, and when electric potential at left terminal of current detecting resistor 53 is higher than that at right terminal thereof, polarity detecting comparator 54 switches synchronized control signal $V_{SC}$ from low to high voltage level as shown in FIG. 2. Then, when energy release from transformer 2 is finished to exhaust current flow $I_{Q2}$ from secondary winding 2b of transformer 2 through rectification MOS-FET 51 before turning-on of main MOS-FET 3, voltages at left and right terminals of current detecting resistor 53 become nearly equal to each other so that polarity detecting comparator 54 switches synchronized control signal $V_{SC}$ from high to low voltage level as shown in FIG. 2.

Pulse width elongation circuit 55 comprises a chopping or triangular wave oscillating circuit or oscillator 56 for generating triangular wave signals $V_{OS}$ as oscillation signals of its frequency (in the order of 200 Hz) sufficiently lower than operation frequency (in the order of 50 kHz) of main MOS-FET 3; a changeover diode 57 which has an anode terminal connected to an output terminal of polarity detecting comparator 54 in synchronized rectification controller 52; a timer capacitor 59 connected between a cathode terminal of changeover diode 57 and an upper end of secondary winding 2b of transformer 2 through current detecting resistor 53; a discharge resistor 58 connected in parallel to timer capacitor 59; and a modulation comparator 60 which has an inverted input terminal connected to chopping wave oscillator 56 and a non-inverted input terminal connected to timer capacitor 59 to compare voltage of triangular wave signal $V_{OS}$ from chopping wave oscillator 56 with voltage $V_{C4}$ from timer capacitor 59 and to produce a comparison output signal as a synchronized drive signal $V_{G2}$ to gate terminal of rectification MOS-FET 51. In detail, when timer capacitor 59 indicates a charged voltage $V_{C4}$ over voltage $V_{OS}$ of triangular wave signal from chopping wave oscillator 56, modulation comparator 60 generates synchronized drive signal $V_{G2}$ of high voltage level to turn rectification MOS-FET 51 from off to on. Adversely, when timer capacitor 59 denotes a charged voltage less than voltage $V_{OS}$ of triangular wave signal from chipping wave oscillator 56, modulation comparator 60 generates a synchronized drive signal $V_{G2}$ of low voltage level to turn rectification MOS-FET 51 from on to off. Other configurations in FIG. 1 are generally same as those in FIG. 6.

In operation of the switching power source device shown in FIG. 1, when drive signal generator 10 produces a main drive signal $V_{G1}$ of high voltage level, main MOS-FET 3 is turned from off to on to allow linearly rising current flow $I_{Q1}$ of FIG. 2 to pass from DC power source 1 through primary winding 2a of transformer 2 and main MOS-FET 3 to DC power source 1 while accumulating electric energy in transformer 2. On the other hand, as voltage of negative polarity is induced on secondary winding 2b of transformer 2 at this time, polarity detecting comparator 54 produces synchronized control signal $V_{SC}$ of low voltage level shown in FIG. 2 to bias changeover diode 57 in the adverse direction to non-conductive state. Accordingly, timer capacitor 59 holds voltage $V_{C4}$ of low voltage level below voltage $V_{OS}$ of triangular wave signal from chopping wave oscillator 56 so that modification comparator 60 forwards synchronized drive signal $V_{G2}$ of low voltage level to maintain rectification MOS-FET 51 off.

When drive signal generator 10 produces main drive signal $V_{G1}$ of low voltage level to turn main MOS-FET 3 from on to off, voltage of positive polarity is raised on secondary winding 2b of transformer 2. When left terminal of current detecting resistor 53 comes to a higher potential than that at right terminal due to induced voltage on secondary winding 2b of transformer 2, polarity detecting comparator 54 forwards a synchronized control signal $V_{SC}$ of high voltage level. Accordingly, changeover diode 57 is biased in the forward direction to conductive state to instantaneously electrically charge timer capacitor 59 to high voltage level. At this time, as voltage $V_{C4}$ shown in FIG. 2 on timer capacitor 59 exceeds voltage $V_{OS}$ of triangular wave signal from chopping wave oscillator 56, modulation comparator 60 produces synchronized drive signal $V_{G2}$ of high voltage level to turn rectification MOS-FET 51 from off to on. Consequently, energy stored in transformer 2 during on-period of main MOS-FET 3 produces electric current $I_{Q2}$ which flows from secondary winding 2b of transformer 2 through rectification MOS-FET 51 and smoothing capacitor 6 in rectification smoother 4 in a linearly decreasing fashion.

When energy release from transformer 2 is finished, electric current $I_{Q2}$ shown in FIG. 2 through rectification MOS-FET 5 reaches approximately zero volt, and simultaneously, polarity detecting comparator 54 changes synchronized control signal $V_{SC}$ from high to low voltage level. This biases changeover diode 57 in the adverse direction to non-conductive state, and timer capacitor 59 is discharged through discharge resistor 58 to gradually reduce voltage $V_{C4}$ shown in FIG. 2 on timer capacitor 59 with a time constant determined by the product of a resistance value by discharge resistor 58 and capacitance by timer capacitor 59. When discharge voltage $V_{C4}$ on timer capacitor 59 is higher than voltage $V_{OS}$ of triangular wave signal from chopping wave oscillator 56, modulation comparator 60 issues synchronized drive signal $V_{G2}$ of high voltage level to retain on-state of rectification MOS-FET 51. Subsequently, when discharge voltage $V_{C4}$ on timer capacitor 59 is lowered below voltage $V_{OS}$ of triangular wave signal from chopping wave oscillator 56, modulation comparator 60 develops synchronization signal $V_{G2}$ of low voltage level to turn rectification MOS-FET 51 from on to off.

In the embodiment shown in FIG. 1, after synchronized rectification controller 52 has changed its synchronized control signal $V_{SC}$ from high to low voltage level, voltage $V_{C4}$ on timer capacitor 59 is discharged with the above-mentioned time constant, and when voltage $V_{C4}$ goes down below voltage $V_{OS}$ of triangular wave signal from chopping wave oscillator 56, modulation comparator 60 produces output signal $V_{G2}$ of low voltage level to turn rectification MOS-FET 51 from on to off. Thus, the off time for switching rectification MOS-FET 51 from on to off is delayed by pulse width corresponding to the period of time until discharged voltage $V_{C4}$ on timer capacitor 59 drops to below voltage $V_{OS}$ of triangular wave signal from chopping wave oscillator 56 since commencement of its discharge. The delayed span or term is relatively short in a period of time or cycle $T_1$ shown in FIG. 2 because the delayed interval of time denotes the term from commencement of discharge from timer capacitor 59 to a point in time at which discharged voltage $V_{C4}$ on timer capacitor 59 drops less than voltage $V_{OS}$ of triangular wave signal from chopping wave oscillator 56 to provide a short delay time for turning rectification MOS-FET 51 off. Since then, according to time course, delay times shown in FIG. 2 in the order of $T_2$, $T_3$ become gradually longer because each delay time shows a time frame from discharge start of timer capacitor 59 to the drop of discharged voltage $V_{C4}$ to below voltage $V_{OS}$ of triangular wave signal from chopping wave oscillator 56, and therefore, delayed durations become greater to turn rectification MOS-FET 51 off. In this way, time lags apply to delay the timing for turning rectification MOS-FET 51 off after the end of energy release from transformer 2 to elongate on-pulse width of rectification MOS-FET 51. Other fundamental operations of the switching power source device shown in FIG. 1 than the foregoing are generally similar to those of prior art pseudo-resonant switching power source device shown in FIG. 6.

Further or other modifications or variations may be applied to the switching power source device according to the embodiment shown in FIG. 1. By way of example, FIG. 4 illustrates another embodiment of the switching power source device according to the present invention wherein it comprises another pulse width elongation circuit 55 for extending on-pulse width for rectification MOS-FET 51 by prolonged pulse width after synchronized rectification controller 52 changes synchronized control signal $V_{SC}$ from high to low voltage level.

Figure 4:
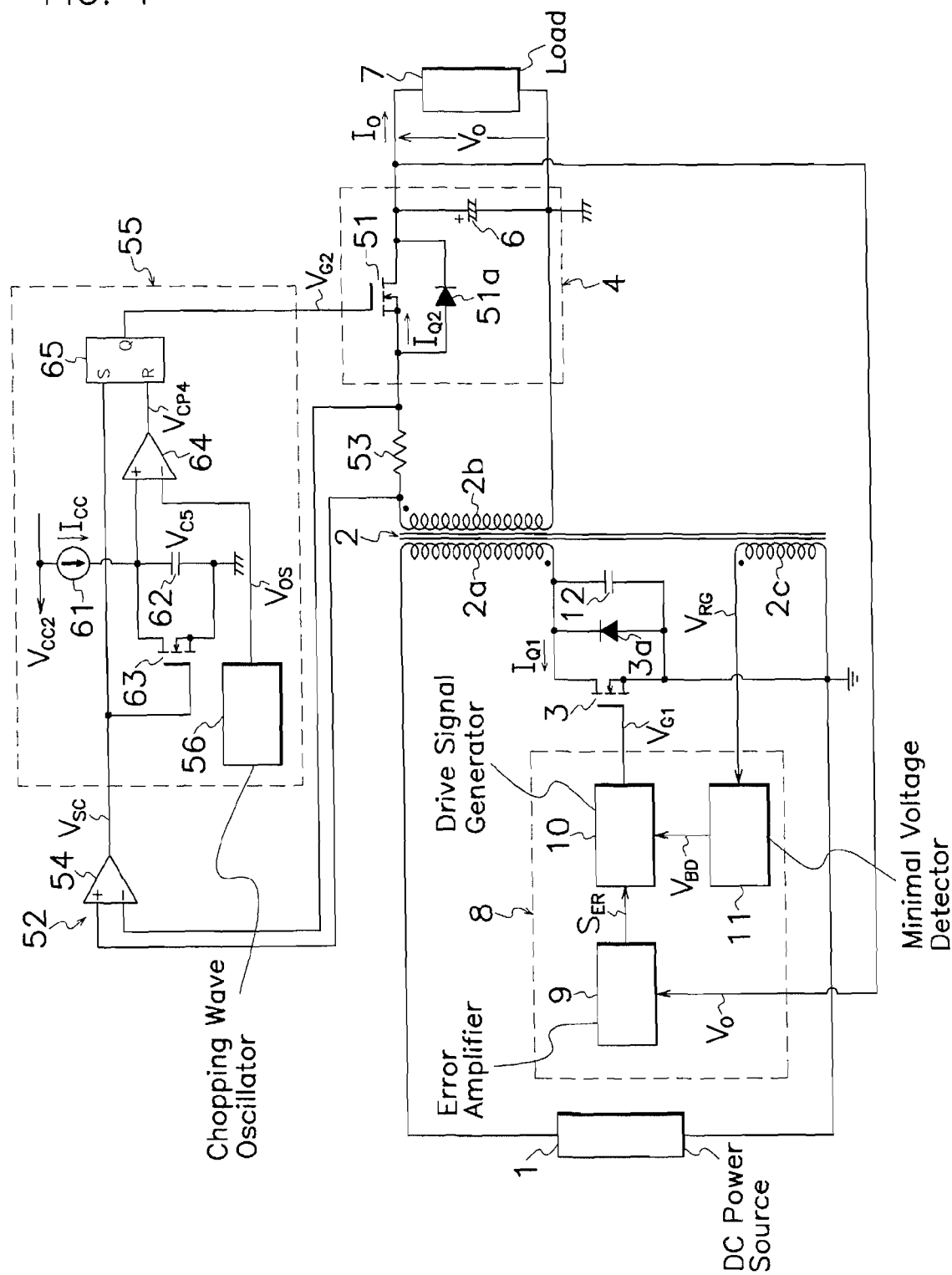
[FIG. 4] An electric circuit diagram showing another embodiment of the switching power source device according to the present invention.

Pulse width elongation circuit 55 shown in FIG. 4 comprises a chopping wave oscillation circuit 56 for producing triangular wave signals $V_{OS}$ of frequency (in the order of 200 Hz) sufficiently lower than operation frequency (in the order of 50 kHz) of main MOS-FET 3; a regular current generator 61 and a timer capacitor 62 connected in series between a drive power source $V_{CC2}$ and a secondary ground terminal; a discharge MOS-FET 63 that has drain and source terminals connected to both ends of a timer capacitor 62 and a gate terminal connected to an output terminal of a polarity detecting comparator 54 in a synchronized rectification controller 52; a modulation comparator 64 that has an inverted input terminal connected to chopping wave oscillator 56 and a non-inverted input terminal connected to a timer capacitor 62 for comparing voltage $V_{OS}$ of triangular wave signals from chopping wave oscillator 56 with voltage $V_{C5}$ on timer capacitor 62; and an RS flip flop 65 as a drive circuit that has a set terminal S connected to polarity detecting comparator 54 in synchronized rectification controller 52, a reset terminal R connected to an output terminal of modulation comparator 64 and an output terminal Q connected to a gate terminal of rectification MOS-FET 51 to provide synchronized drive signals $V_{G2}$ from RS flip flop 65 for rectification MOS-FET 51. In operation, when charge voltage $V_{C5}$ on timer capacitor 62 exceeds and drops to below voltage $V_{OS}$ of triangular wave signal from chopping wave oscillator 56, modulation comparator 64 emits a reset signal $V_{CP4}$ of respectively high and low voltage level. Receiving synchronized control signal $V_{SC}$ of high voltage level from synchronized rectification controller 52 at set terminal S, RS flip flop 65 generates synchronized drive signal $V_{G2}$ of high voltage level from output terminal Q to turn rectification MOS-FET 51 from off to on and keep on state. On the other hand, receiving reset signal $V_{CP4}$ of high voltage level from modulation comparator 64 at reset terminal R, RS flip flop 65 switches synchronized control signal $V_{SC}$ from high to low voltage level at output terminal Q to turn rectification MOS-FET 51 from on to off. Other configurations in the circuit shown in FIG. 4 than the foregoing are substantially the same as those in switching power source device shown in FIG. 1.

In operation of the switching power source device shown in FIG. 4, when drive signal generator 10 produces a main drive signal $V_{G1}$ of high voltage level, main MOS-FET 3 is turned from off to on to cause linearly increasing electric current $I_{Q1}$ to flow through primary winding 2a of transformer 2 and main MOS-FET 3 and thereby to accumulate electric energy in transformer 2. At this moment, negatively-polarized voltage is induced on secondary winding 2b of transformer 2, and at the same time, polarity detecting comparator 54 issues synchronized control signal $V_{SC}$ of low voltage level shown in FIG. 5 to set terminal S of RS flip flop 65. Simultaneously, synchronized control signal $V_{SC}$ of low voltage level is also given to gate terminal of discharge MOS-FET 63 to maintain it in off state. This is the period to keep timer capacitor 62 on voltage $V_{C5}$ higher than that $V_{OS}$ of triangular wave signal from chopping wave oscillator 56 because timer capacitor 62 is successively electrically charged by charging current of constant level supplied from drive power source $V_{CC2}$ through regular current generator 61 into timer capacitor 62. Therefore, modulation comparator 64 provides reset signal $V_{CP4}$ of high voltage level for reset terminal R of RS flip flop 65 to maintain it in reset state. Under the circumstances, RS flip flop 65 supplies synchronized drive signal $V_{G2}$ of low voltage level to gate terminal of rectification MOS-FET 51 to retain its off-state.

When drive signal generator 10 produces main drive signal $V_{G1}$ of low voltage level to turn main MOS-FET 3 from on to off, a positively-polarized voltage emerges on secondary winding 2b of transformer 2. When positively-polarized voltage elevates electric potential at left terminal of current detecting resistor 53 at a higher level than that at right terminal thereof, polarity detecting comparator 54 supplies synchronized control signal $V_{SC}$ of high voltage level shown in FIG. 5 to set terminal S of RS flip flop 65 and gate terminal of discharge MOS-FET 63. Consequently, RS flip flop 65 is switched to set condition to supply synchronized drive signal $V_{G2}$ of high voltage level shown in FIG. 5 from RS flip flop 65 to gate terminal of rectification MOS-FET 51 which therefore is turned from off to on. Concurrently, as discharge MOS-FET 63 is turned from off to on, timer capacitor 62 is discharged at once, and when discharge voltage $V_{C5}$ on timer capacitor 62 drops to below voltage $V_{OS}$ of triangular wave signal from chopping wave oscillator 56, modulation comparator 64 provides reset signal $V_{CP4}$ of low voltage level for reset terminal R of RS flip flop 65. Accordingly, RS flip flop 65 is kept in set state to continuously produce synchronized drive signal $V_{G2}$ of high voltage level at output terminal Q to gate terminal of rectification MOS-FET 51 which thereby is kept on. This is the on-period of main MOS-FET 5 to release energy accumulated during the on-period of main MOS-FET 3 to rectification smoother 4 by causing linearly decreasing electric current shown in FIG. 5 to flow from secondary winding 2b of transformer 2 through rectification MOS-FET 51 to smoothing capacitor 6.

Figure 5:
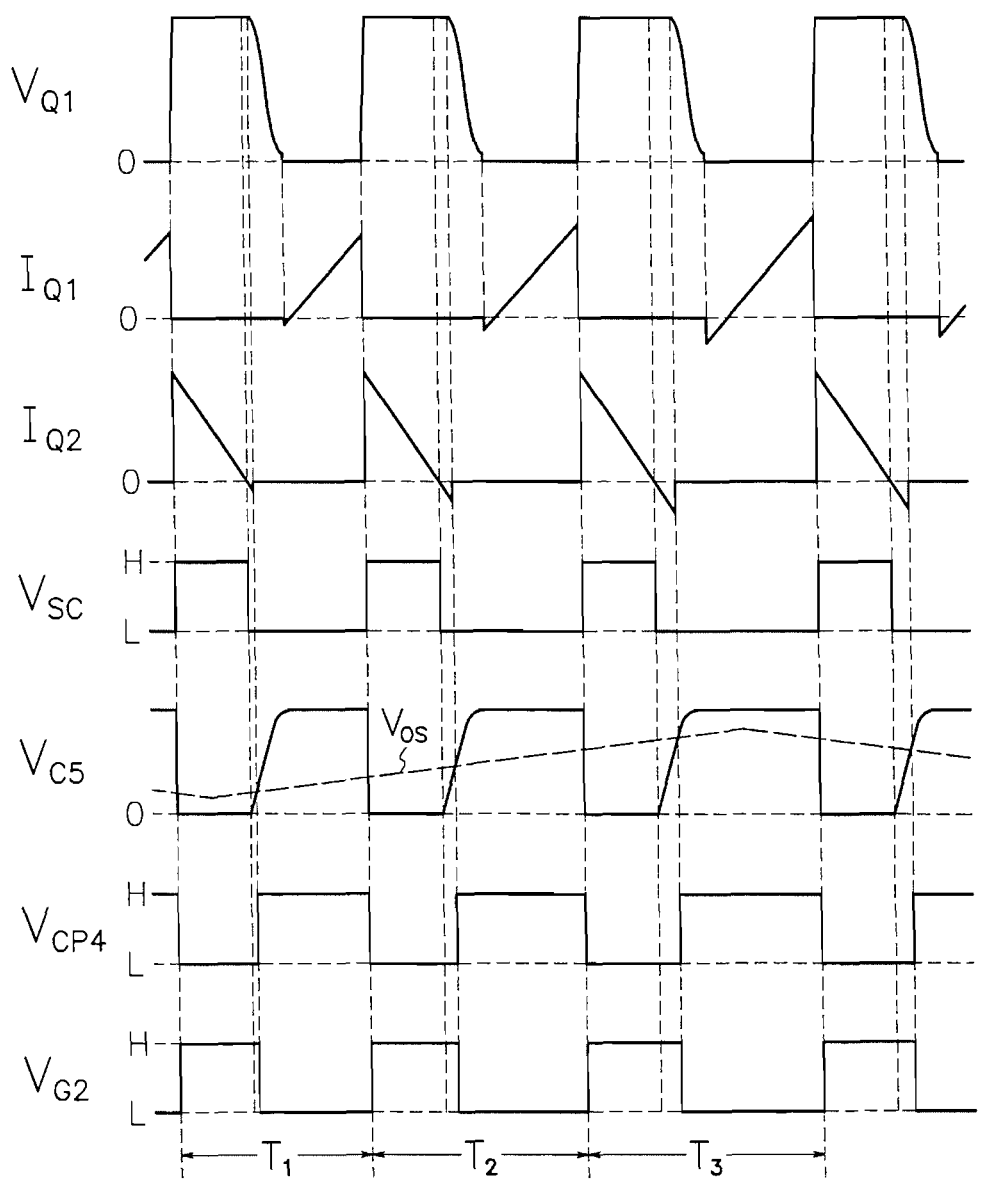
[FIG. 5] Waveform timing charts showing variation in voltages and electric currents at selected locations of the switching power source device in FIG. 4.

Upon completion of energy release stored in transformer 2, electric current $I_{Q2}$ shown in FIG. 5 through rectification MOS-FET 51 comes to nearly zero to shift synchronized control signal $V_{SC}$ from polarity detecting comparator 54 from high to low voltage level toward set terminal S of RS flip flop 65 and gate terminal of discharge MOS-FET 63. At that time, discharge MOS-FET 63 is turned from on to off, and charging current flow is fed from drive power source $V_{CC2}$ through regular current generator 61 to timer capacitor 62 to electrically charge it with a given time constant while voltage $V_{C5}$ on timer capacitor 62 gradually rises. When charged voltage $V_{C5}$ on timer capacitor 62 is lower than voltage $V_{OS}$ of triangular wave signal from chopping wave oscillator 56, modulation comparator 64 forwards reset signal $V_{CP4}$ of low voltage level to reset terminal R of RS flip flop 65 which therefore remains set state to maintain rectification MOS-FET 51 on. Thereafter, once charged voltage $V_{C5}$ on timer capacitor 62 exceeds voltage $V_{OS}$ of triangular wave signal from chopping wave oscillator 56, modulation comparator 64 changes reset signal $V_{CP4}$ to reset terminal of RS flip flop 65 from low to high voltage level. Accordingly, RS flip flop 65 is turned to reset state to switch synchronized drive signal $V_{G2}$ from high to low voltage level at output terminal Q to gate terminal of rectification MOS-FET 51 which thereby is turned from on to off.

In the embodiment shown in FIG. 4, when synchronized rectification controller 52 produces synchronized control signal $V_{SC}$ of high voltage level, RS flip flop 65 switches rectification MOS-FET 51 from off to on and maintains it in on state. After synchronized rectification controller 52 switches synchronized control signal $V_{SC}$ from high to low voltage level, charged voltage $V_{C5}$ in timer capacitor 62 rises with a given time constant, and when charged voltage $V_{C5}$ reaches voltage $V_{OS}$ of triangular wave signal from chopping wave oscillator 56, modulation comparator 64 provides reset signal $V_{CP4}$ of high voltage level to reset RS flip flop 65 thereby causing rectification MOS-FET 51 to switch from on to off. Accordingly, on-pulse width of rectification MOS-FET 51 is extended by adding thereto a pulse span corresponding to a time lag from the expiration time of synchronized control signal $V_{SC}$ of high voltage level from synchronized rectification controller 52 for rectification MOS-FET 51 to the issue time of reset signal $V_{CP4}$ of high voltage level from modulation comparator 64 after the beginning of electrically charging timer capacitor 62. Since a cycle time $T_1$ shown in FIG. 5 is relatively short from onset of electric charge into timer capacitor 62 to emission of reset signal $V_{CP4}$ of high voltage level from modulation comparator 64, synchronized drive signal $V_{G2}$ of shorter on-pulse width is supplied to rectification MOS-FET 51. After that, according to time course, cycle times like in the order of $T_2$, $T_3$ are elongated from onset of electric charge into timer capacitor 62 to output of reset signal $V_{CP4}$ of high voltage level from modulation comparator 64, and hence, synchronized drive signals $V_{G2}$ of longer on-pulse width are supplied to rectification MOS-FET 51. In this way, after duration of on-pulse width in synchronized control signal $V_{SC}$ of high voltage level from synchronized rectification controller 52 to rectification MOS-FET 51, a further on-pulse width may be added to the original on-pulse width of synchronized control signal $V_{SC}$ of high voltage level from synchronized rectification controller 52 to extend the original on-pulse width after its expiration. Other basic operations of switching power source device shown in FIG. 4 than those of the foregoing are much the same as those of prior art pseudo resonant switching power source device shown in FIG. 6.

In each embodiment shown in FIGS. 1 and 4, when main MOS-FET 3 is turned off, excitation energy is released from secondary winding 2b of transformer 2. After ejection of excitation energy from transformer 2, pulse width elongation circuit 55 extends on-pulse width for rectification MOS-FET 51, and as a result, a regeneration current $-I_{Q2}$ emerges which adversely flows from smoothing capacitor 6 in rectification smoother 4 through rectification MOS-FET 51 and secondary winding 2b of transformer 2 to smoothing capacitor 6 while applying voltage of smoothing capacitor 6 on secondary winding 2b of transformer 2. This provokes voltage on primary winding 2a of transformer 2 to maintain voltage $V_{Q1}$ between drain-source terminals of main MOS-FET 3 at a substantially same level as that during release period of excitation energy from transformer 2. Then, when rectification MOS-FET 51 is turned from on to off, voltage resonance arises through inductance on primary winding 2a of transformer 2 and voltage resonant capacitor 12 to lower voltage of primary winding 2a of transformer 2, and in line with this, voltage $V_{Q1}$ between drain-source terminals of main MOS-FET 3 decreases. At the time voltage $V_{Q1}$ between drain-source terminals of main MOS-FET 3 becomes a minimum value, main control circuit 8 switches main MOS-FET 3 from off to on to elongate off-pulse width of main MOS-FET 3. In response to this, main control circuit 8 holds voltage of smoothing capacitor 6 at a substantially given level to extend on-pulse width for main MOS-FET 3. In other words, each time cycle or term $T_1$, $T_2$ or $T_3$ goes on, both on- and off-pulse widths of main MOS-FET 3 are extended, lowering operation frequency of main MOS-FET 3. As just described, the switching power source device can vary on-pulse width of rectification MOS-FET 51 on secondary side to adjust an amount of energy regenerated in primary side of transformer 2, make changes in both on- and off-pulse widths of main MOS-FET 3 and thereby modulate operation frequency of main MOS-FET 3. Accordingly, although noise may arise from main drive signals $V_{G1}$ of main MOS-FET 3, the device can disperse such noise in each of frequency components depending on varied frequency of main MOS-FET 3 to thereby cut down voltage level of noise by dispersing it at each frequency component while preventing malfunction of electronic instruments by noise. On the other hand, it would be appreciated that one can select as required a frequency of triangular wave signal $V_{OS}$ from chopping wave oscillator 56, capacitance of timer capacitor 59, resistance value of discharge resistor 58 and/or current value of regular current generator 61 to vary operation frequency of maim MOS-FET 3 to an appropriate range. In addition, after turning-off of main MOS-FET 3, energy is regenerated on primary side of transformer 2 and accumulated in primary winding 2a of transformer 2. Then, when main MOS-FET 3 is turned from off to on, electric current $-I_{Q1}$ passes through parasitic diode 3a of main MOS-FET 3 to reset energy stored in primary winding 2a of transformer 2 while pulling charge in voltage-resonant capacitor 12 to reduce voltage $V_{Q1}$ between drain-source terminals of main MOS-FET 3 to approximately zero volt. For that reason, main MOS-FET 3 can be turned from off to on for zero voltage switching (ZVS) to reduce switching loss of main MOS-FET 3.

Embodiments of the present invention can be further modified and varied without limiting to the foregoing embodiments. For example, they utilize triangular wave signals of frequency in the order of 200 Hz as oscillation signals of frequency sufficiently lower than operation frequency (in the order of 50 kHz) of main MOS-FET 3, however, in lieu of triangular wave signals, they may utilize sine-wave signals having similar frequency or frequency-modulated (FM) signals whose frequency is regularly or irregularly changed. Also, synchronized rectification controller 52 in each of the foregoing embodiments may employ current detecting resistor 53 connected at an optional location in a closed circuit comprised of secondary winding 2b of transformer 2, rectification MOS-FET 51 and smoothing capacitor 6. In place of current detecting resistor 53, a current detecting transformer (CT) may be used to detect electric current through rectification MOS-FET 51. In each of the above embodiments, current detecting resistor 53 picks up electric current $I_{Q2}$ through rectification MOS-FET 51 to produce synchronized control signals $V_{SC}$, however, not limited to this, other methods may be used to generate synchronized control signals $V_{SC}$, for example, by equivalently detecting the period of time during which electric current $I_{Q2}$ flows through rectification MOS-FET 51 making use of electric charging and discharging operation of capacitor or energy-accumulation and release of reactor. The above embodiments utilize MOS-FETs for main switching element 3 and rectification switching element 51, however, they may utilize switching elements of other type such as bipolar transistors of junction or insulated gate type.

APPLICABILITY OF INVENTION IN INDUSTRY

The present invention is preferably applicable to resonant switching power source devices having a resonance circuit on primary side like pseudo-resonant switching power source devices of flyback type.

The invention claimed is:

1. A switching power source device comprising a primary winding of a transformer and a main switching element both connected in series to a DC power source,
   a voltage-resonant capacitor connected in parallel to said main switching element,
      a rectification smoothing circuit connected to a secondary winding of said transformer and having at least a rectification switching element and a smoothing capacitor,
   a synchronized rectification control circuit for producing synchronized control signals to turn said rectification switching element from off to on after turning-off of said main switching element and to turn said rectification switching element from on to off before turning-on of said main switching element,
   a pulse width elongation circuit for extending on-pulse width of said rectification switching element, and
   a main control circuit for producing main drive signals to turn said main switching element off and on with an operation frequency responsive to on-pulse width of said rectification switching element extended by said pulse width elongation circuit,
   wherein said pulse width elongation circuit comprises:
   an oscillation circuit for generating oscillation signals of its frequency sufficiently lower than operation frequency of said main switching element,
   a timer capacitor electrically charged by the synchronized control signal from said synchronized rectification control circuit, said timer capacitor starting electrical discharge with a given time constant upon cease of outputting the synchronized control signal, and
   a comparator for comparing voltage of the oscillating signal from said oscillation circuit with voltage of said timer capacitor,
   when charged voltage of said timer capacitor exceeds voltage of oscillating signal from said oscillation circuit, said comparator switches said rectification switching element from off to on, and
   when discharged voltage of said timer capacitor is equal to or less than voltage of oscillating signal from the oscillation circuit, said comparator switches said rectification switching element from on to off.

2. The switching power source device of claim 1, wherein said main control circuit serves to extend or shorten on-pulse width and off-pulse width for the main switching element by extension or shortening of on-pulse width for said rectification switching element to respectively decrease or increase operation frequency of said main switching element.

3. The switching power source device of claim 1, wherein said main switching element is turned on to accumulate energy in said transformer,
   said main switching element is turned off to release energy accumulated in said transformer to said rectification smoothing circuit,
   said main switching element is turned from off to on by a minimal value in oscillating voltage appearing on each winding of said transformer after completion of energy release from said transformer,
   said rectification switching element is turned from off to on upon onset of energy release from said transformer, and said rectification switching element is turned from on to off after completion of energy release from said transformer.

4. The switching power source device of claim 3, wherein said main control circuit turns said main switching element from off to on upon receiving a minimal value in oscillating voltage appearing on an auxiliary winding of said transformer after completion of energy release from said transformer.

5. The switching power source device of claim 1, wherein said pulse width elongation circuit retards off-time of said rectification switching element by an extended pulse width after said synchronized rectification control circuit ceases output of said synchronized control signal.

6. The switching power source device of claim 1, wherein the pulse width elongation circuit adds an extended pulse width to on-pulse width for the rectification switching element after the synchronized rectification control circuit ceases outputting the synchronized control signal.

7. A switching power source device comprising a primary winding of a transformer and a main switching element both connected in series to a DC power source,
   a voltage-resonant capacitor connected in parallel to said main switching element,
      a rectification smoothing circuit connected to a secondary winding of said transformer and having at least a rectification switching element and a smoothing capacitor,
   a synchronized rectification control circuit for producing synchronized control signals to turn said rectification switching element from off to on after turning-off of said main switching element and to turn said rectification switching element from on to off before turning-on of said main switching element,
   a pulse width elongation circuit for extending on-pulse width of said rectification switching element, and
   a main control circuit for producing main drive signals to turn said main switching element off and on with an operation frequency responsive to on-pulse width of said rectification switching element extended by said pulse width elongation circuit,
   wherein said pulse width elongation circuit comprises:
   an oscillation circuit for generating oscillation signals of its frequency sufficiently lower than operation frequency of said main switching element,
   a timer capacitor electrically charged by the synchronized control signal from said synchronized rectification control circuit, said timer capacitor starting electrical discharge with a given time constant upon cease of outputting the synchronized control signal,
   a comparator for comparing voltage of the oscillating signal from said oscillation circuit with voltage of said timer capacitor, and
   a drive circuit for supplying drive signals to the rectification switching element,
   the comparator produces a stop signal when charged voltage on the timer capacitor exceeds voltage of oscillating signal from the oscillation circuit,
   the comparator ceases the stop signal when the discharge voltage of the timer capacitor is equal to or less than voltage of oscillating signal from the oscillation circuit,
   said drive circuit switches the rectification switching element from off to on and maintains the rectification switching element in the on-state when receiving the synchronized control signal from the synchronized rectification control circuit, and said drive circuit switches the rectification switching element from on to off when receiving a stop signal from said comparator.

8. The switching power source device of claim 7, wherein said main control circuit serves to extend or shorten on-pulse width and off-pulse width for the main switching element by extension or shortening of on-pulse width for said rectification switching element to respectively decrease or increase operation frequency of said main switching element.

9. The switching power source device of claim 7, wherein said main switching element is turned on to accumulate energy in said transformer,
said main switching element is turned off to release energy accumulated in said transformer to said rectification smoothing circuit,
said main switching element is turned from off to on by a minimal value in oscillating voltage appearing on each winding of said transformer after completion of energy release from said transformer,
said rectification switching element is turned from off to on upon onset of energy release from said transformer, and said rectification switching element is turned from on to off after completion of energy release from said transformer.

10. The switching power source device of claim 9, wherein said main control circuit turns said main switching element from off to on upon receiving a minimal value in oscillating voltage appearing on an auxiliary winding of said transformer after completion of energy release from said transformer.

11. The switching power source device of claim 7, wherein said pulse width elongation circuit retards off-time of said rectification switching element by an extended pulse width after said synchronized rectification control circuit ceases output of said synchronized control signal.

12. The switching power source device of claim 7, wherein the pulse width elongation circuit adds an extended pulse width to on-pulse width for the rectification switching element after the synchronized rectification control circuit ceases outputting the synchronized control signal.

* * * * *